(No Model.)
J. MEANY & C. H. BODIE.
SELF CLOSING FAUCET.
No. 444,912. Patented Jan. 20, 1891.
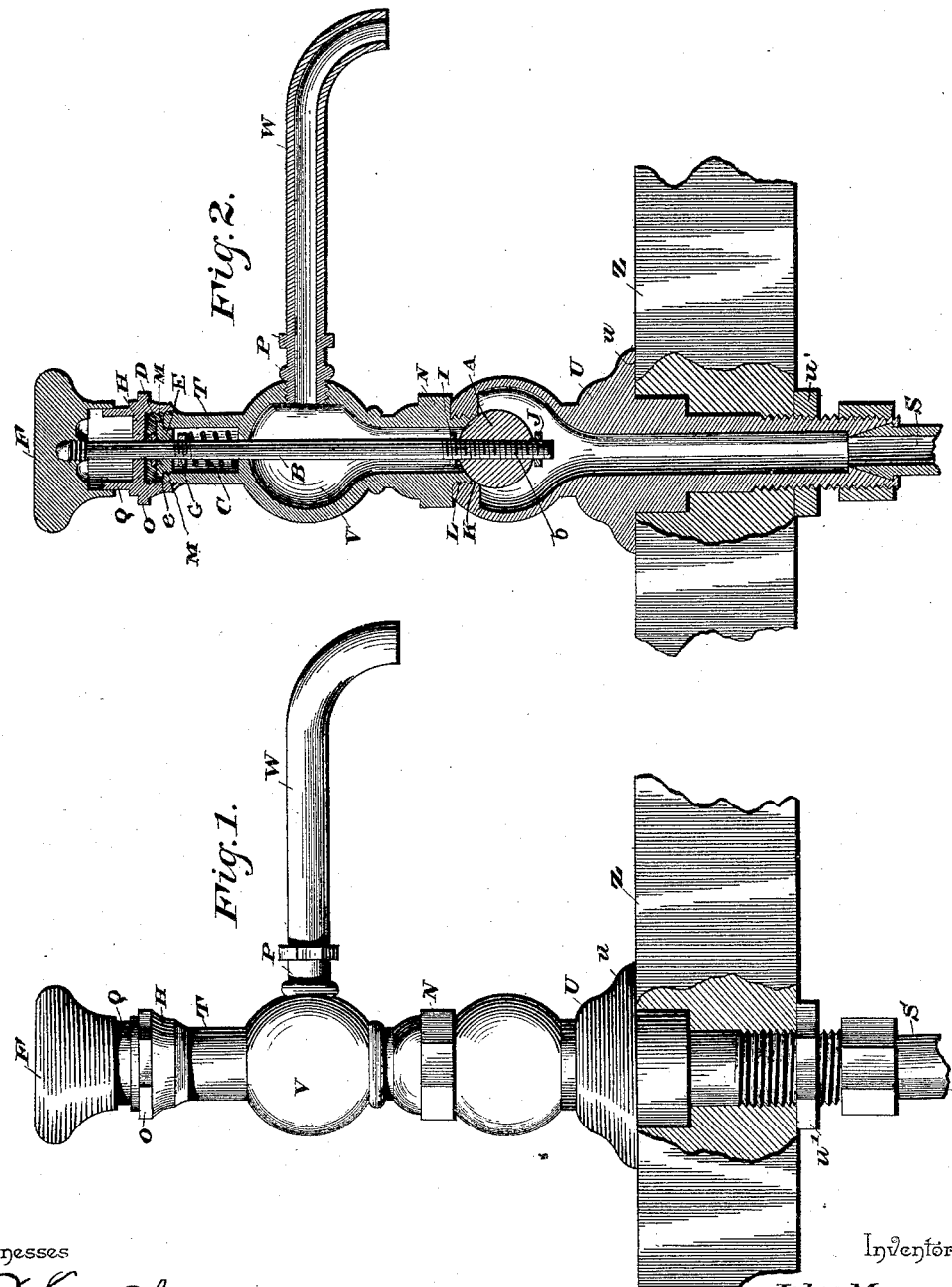
Witnesses
Inventors
John Meany.
Charlie H. Bodie.
By their Attorneys,

UNITED STATES PATENT OFFICE.

JOHN MEANY AND CHARLIE H. BODIE, OF SANTA BARBARA, CALIFORNIA.

SELF-CLOSING FAUCET.

SPECIFICATION forming part of Letters Patent No. 444,912, dated January 20, 1891.

Application filed August 13, 1890. Serial No. 361,860. (No model.)

*To all whom it may concern:*

Be it known that we, JOHN MEANY and CHARLIE H. BODIE, citizens of the United States, residing at Santa Barbara, in the county of Santa Barbara and State of California, have invented a new and useful Self-Closing Faucet, of which the following is a specification.

This invention relates to water distribution, and is more especially a self-closing faucet adapted to be used in connection with stationary wash-bowls or sinks; and the object of the invention is to produce a faucet of this character possessing certain improvements in its detail and specific construction, all as hereinafter more fully described, and illustrated in the drawings, in which—

Figure 1 is a side elevation, and Fig. 2 a central vertical section, of this improved faucet.

Referring to the said drawings, the letter Z designates a basin or wash-stand top, and S is the supply-pipe beneath the same. To this pipe is connected the lower member U of the faucet, which extends upwardly through the table Z, and has a shoulder $u$ resting thereon, a nut $u'$ below the table holding this member in place.

V is the upper member of the faucet, whose lower end is threaded, as at L, and screwed into the upper end of the lower member U, a nut N being formed upon the exterior of the upper member V for this purpose, as seen in Fig. 1.

W is the delivery-spout, having an exterior nut P, and screwed into the upper member V, as shown.

H is a cap-piece screwed onto the upper end of the upper member, and having an exterior nut O for this purpose, and F is the operating-knob, which slides over the cap-piece H, as shown at Q. By this means the spout can be detached from the upper member, the latter from the lower member, the knob from the cap-piece, or the latter from the upper member, as will be readily understood.

In the upper end of the upper member is a chamber T, interiorly screw-threaded, as at M at its mouth, and into said mouth is screwed a nut E, having a raised center $e$. Above this nut and surrounding its raised center is a packing D, of leather or rubber, which is inclosed within the cap-piece H, and through the center of all these parts passes a vertical rod B, which screws into the knob F at the top, and has a threaded lower end $b$. Upon said lower end is loosely mounted a ball A, between nuts I and J, on the threaded end $b$, said ball when elevated bearing against the valve-seat K in the lower end of the upper member V, but when depressed permitting a flow of water through the faucet as will be clear. When the cap-piece H is turned the soft packing D will be compressed, and will be caused to bind more tightly around the rod B, the latter being, however, guided through the central perforations of the cap-piece H and the nut E.

Below the nut E, within the chamber T, is located a coiled expansive spring C around the rod B, and on the latter is a nut G, which may be adjusted to regulate the force of the spring. If at any time it is desired to have a small flow of water constantly through the faucet—for instance, to prevent freezing—the nut G may be moved up upon the rod B until it will strike the nut E at such point as to prevent the valve A from being completely closed. As the packing D becomes worn by constant movement of the rod B vertically therethrough and the cap-piece H is screwed farther and farther down, the nut E may be also screwed down with the following result: The edges of the chamber T project above the nut E as the latter is screwed down, and partially fill the space within the cap-piece H, and the raised center $e$ of the nut at all times occupies the lower portion of the center of this space. By this means, as the cap-piece H is scewed down, the packing D is squeezed or pressed inwardly toward the rod B, and if the edges of the chamber T be considerably raised the packing will be forced against the rod all the more tightly. It will be understood, however, that the adjustment of this cap and the regulation of the density of the packing D will in no wise affect the movement of the nut G and the adjustment of the tension of the spring C.

What is claimed as new is—

1. In a faucet, the combination, with the faucet-casing V, having a chamber T in its upper end provided with interior and exterior screw-threads at its mouth, a valve A within said casing, and a rod B for operating the valve, said rod passing centrally through said chamber, of a nut E, screwed into the mouth of the chamber and loosely surrounding said rod, said nut having a raised center e, a cap-piece H, screwed upon the exterior of said casing and covering said nut E, and a flexible packing D between said nut and cap-piece and around said rod, as and for the purpose set forth.

2. In a self-closing faucet, the combination, with the faucet-casing V, having a valve-seat at its lower end and a chamber T in its upper end, provided with interior and exterior screw-threads at its mouth, a rod B, moving vertically through said casing and chamber, an upwardly-closing valve upon said rod, an expansive spring C within said chamber, surrounding the rod, and an adjusting-nut G on said rod at the upper end of said spring, of a nut E, screwed into the mouth of said chamber, a cap-piece H, screwed upon the exterior of said casing and covering the nut E, a flexible packing D between said nut and cap-piece, the rod B, passing loosely through said nut E, packing D, and cap H, and a knob F secured to the upper end of said rod, as and for the purpose hereinbefore set forth.

In testimony that we claim the foregoing as our own we have hereto affixed our signatures in presence of two witnesses.

JOHN MEANY.
CHARLIE H. BODIE.

Witnesses:
ALEX. A. FREEMAN,
N. F. W. BOESEKE.